No. 642,798. Patented Feb. 6, 1900.
A. E. MACDONALD.
TEA MAKING ATTACHMENT FOR CUPS.
(Application filed June 5, 1899.)

(No Model.)

Witnesses,

Inventor,
Albert E. Macdonald
By Dewey Strong & Co.
Atty.

THE NORRIS PETERS CO., PHOTO-LITHO., WASHINGTON, D. C.

UNITED STATES PATENT OFFICE.

ALBERT E. MACDONALD, OF SAN FRANCISCO, CALIFORNIA.

TEA-MAKING ATTACHMENT FOR CUPS.

SPECIFICATION forming part of Letters Patent No. 642,798, dated February 6, 1900.

Application filed June 5, 1899. Serial No. 719,360. (No model.)

*To all whom it may concern:*

Be it known that I, ALBERT E. MACDONALD, a citizen of the United States, residing in the city and county of San Francisco, State of California, have invented an Improvement in Tea-Making Attachments for Cups; and I hereby declare the following to be a full, clear, and exact description of the same.

My invention relates to a device which is designed for use with tea-cups and for the purpose of making a single cup of tea.

It consists of the parts and the construction and combination of parts hereinafter described and claimed.

Figure 1:
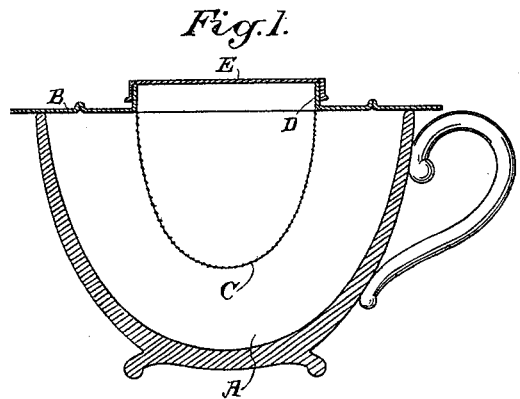
Figure 2:
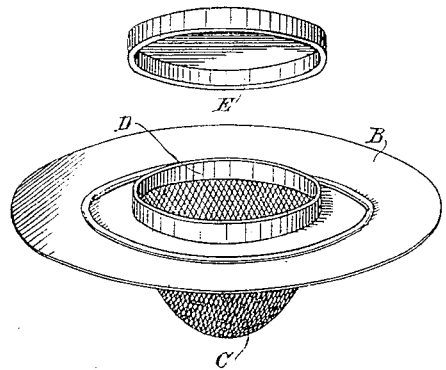

Referring to the accompanying drawings for a more complete explanation of my invention, Figure 1 is a sectional view of the cup, showing my attachment in place. Fig. 2 is a view of the holder and a central cap attached thereto.

A represents an ordinary tea-cup.

B is a cover of somewhat larger diameter adapted to fit upon the top of the cup and having a central opening, around the periphery of which the edges of a screen-basket C are fixed. This basket is spheroidal in form and depends from below the cover B, so that when the latter is placed upon the cup the basket will depend into the cup. Around the periphery of the central opening a circular flange D projects upwardly and a cap or cover E is fitted to be placed thereon.

When it is desired to make a cup of tea, the necessary quantity of tea-leaves is placed in the basket C, the cap E having been removed and the cover B placed upon the cup. Boiling water is then poured through the leaves into the cup and the cap E replaced to prevent the escape of vapor and the aroma of the tea, which is thus allowed to steep for a few moments, when the tea will be ready. When the tea has been made, the cover will be removed, and the cap E having been placed upon the flange D the cover can be inverted and the remaining tea in the basket resting upon the cover will be in readiness for further use, as the first use will not deprive it of all of its valuable qualities and it can be used a second time in the same manner as previously described.

Having thus described my invention, what I claim as new, and desire to secure by Letters Patent, is—

A device for making tea consisting of a cover having a central opening, an annular flange rising from its outer surface and surrounding said opening, a screen-basket fixed in the opening, and a cap having a flange adapted to fit the flange of the cover said cover capable of reversal and its flange and cap forming a chamber for the tea-leaves when the device is reversed.

In witness whereof I have hereunto set my hand.

ALBERT E. MACDONALD.

Witnesses:
S. H. NOURSE,
GEO. H. STRONG.